June 18, 1929.  J. H. McCARTHY  1,717,610
ROTARY ENGINE
Filed June 11, 1925  5 Sheets-Sheet 1

Fig. 1.

INVENTOR
J. H. McCARTHY
BY
ATTORNEYS

Fig. 3.

Patented June 18, 1929.

1,717,610

UNITED STATES PATENT OFFICE.

JOHN H. McCARTHY, OF CHICAGO, ILLINOIS.

ROTARY ENGINE.

Application filed June 11, 1925. Serial No. 36,500.

My invention relates to improvements in rotary engines, and it consists in the combinations, constructions, and arrangements herein described and claimed.

An object of my invention is to provide a rotary engine of the character described in which friction between the moving parts thereof is reduced to a minimum.

A further object of my invention is to provide a device of the type described having radially projectable blade members with which novel means is employed for preventing centrifugal forces from causing undue frictional engagement of the projectable blades with the adjacent stator walls.

A further object of my invention is to provide a device of the type described in which means is employed for cooling the valves, thereby preventing the wasting away of the valve, as frequently occurs in the ordinary type of internal combustion engine. This cooling means also of course prevents all possibility of warpage of the valve, which might cause the valve to leak.

A further object of my invention is to provide a device of the type described in which particularly novel means is employed for operating and timing the valves.

A further object of my invention is to provide a device of the type described in which means is provided for precompressing and igniting the compressed fuel prior to its admission to the working portions of the rotor and stator.

A further object of my invention is to provide a device of the type described in which means is provided for causing a power stroke at each half revolution of the rotor.

Other objects and advantages will appear in the following specification, and the novel features of the invention will be particularly pointed out in the appended claims.

My invention is illustrated in the accompanying drawings forming part of this application, in which Figure 7 is an enlarged sectional view along the line 7—7 of Figure 4, Figure 7$^A$ is a section substantially along the line 7$^A$—7$^A$ of Figure 8, Figure 8 is a section along the line 8—8 of Figure 7$^A$.

Figure 9 is a sectional view of the mechanism illustrated in Figure 1, showing the oil distributing bushing.

In carrying out my invention I make use of a stator body member 1, substantially annular in cross section. A rotor 2 is rotatably mounted within the stator body member 1 and has its axis slightly below the axis of the body 1 so that the peripheral wall of the rotor will lie closely adjacent to the inner stator wall at the bottom, and will clear the inner stator wall at its maximum distance at the top. The proportional differences in the diameters of the stator body 1 and rotor 2 is clearly shown in Figure 3.

Figures 4, 5, 6:
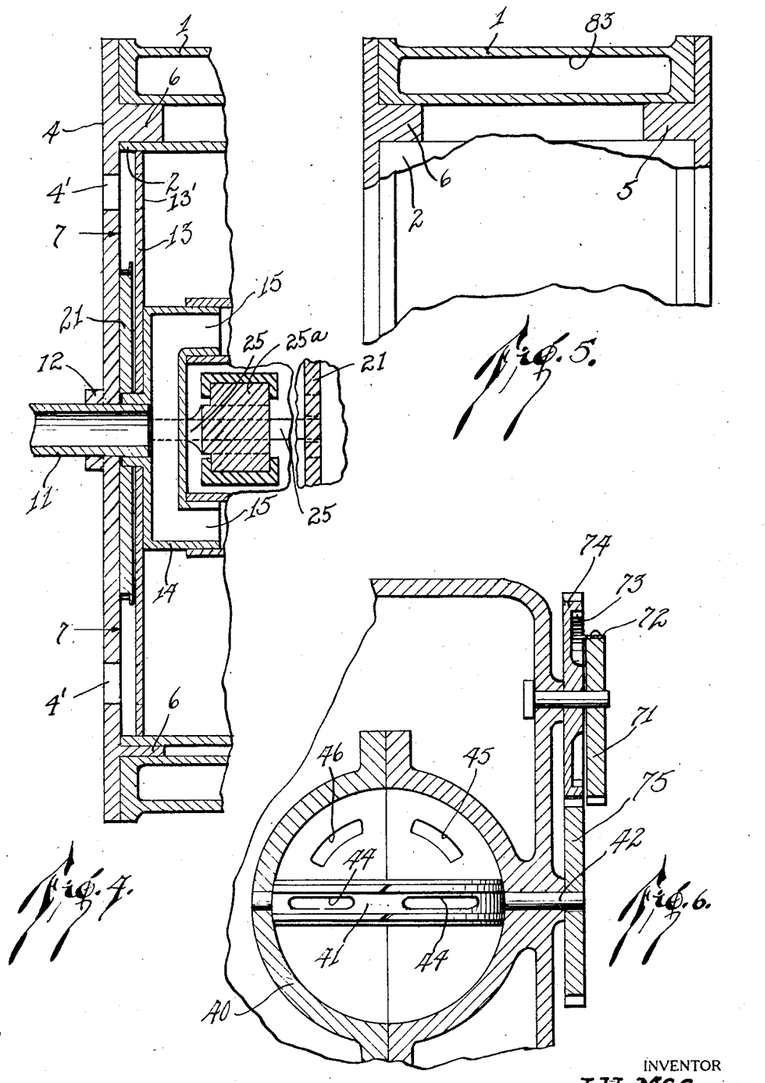
Figure 4 is a sectional view substantially along the line 4—4 of Figure 3.
Figure 5 is a sectional view along the line 5—5 of Figure 3.
Figure 6 is an enlarged sectional view along the line 6—6 of Figure 3.

Means for mounting the rotor 2 within the stator 1 is provided in a pair of perforated end plates 3 and 4 which are secured to the stator body 1 and which have inwardly projecting projections 5 and 6 respectively adapted to partially project within the space between the rotor 2 and the inner wall of the stator 1, substantially as shown at Figure 5. It should be noted at this time that the width of the rotor 2 is such as to cause its side walls to engage with the end plates 3 and 4 respectively.

The rotor 2 has a shaft 8 extending from one side thereof which shaft is secured to the side wall 9 of the rotor 2 by the provision of a bushing 10, the peculiar structure and utility of which shall be hereinafter described. The bushing 10 is projected through a bearing member 11' carried by the end plate 3.

A hollow shaft in the nature of a manifold 11 extends through a bearing member 12 in the end plate 4 from the opposite side 13 of the rotor 2, and is in axial alignment with the shaft 8.

The manifold 11 is secured through a bifurcated manifold member 14 to the side wall 13 of the rotor, and is arranged to turn with the rotor. The side walls 13 are provided with perforations 13' and the end walls 3 and 4 are provided with perforations 4' for the passage of air therethrough.

The outer end of the manifold shaft 11 is connected with a depending manifold member 15ᵃ which is in turn connected with the carburetor 16 from which carburetor the engine derives its fuel. Since the construction of the carburetor and its use with internal combustion engines is well known, I shall not further refer to the structural details thereof.

The innermost portions or ports 15 of the bifurcated member 14 are in engagement with a distributing manifold member 16 which has a pair of conducting portions 17 extending in opposite directions therefrom to the compression chambers of the engine.

In my invention I compress the vaporized fuel prior to ignition of the fuel by means entirely independent of the working power members of the engine.

This end is carried out by the provision of a pair of diametrically opposed compression cylinders 18. The cylinders have their outermost ends adjacent to the inner peripheral wall of the rotor 2 and each has a piston 19 therein. The pistons 19 are connected by a common connecting rod 20 which connecting rod is oscillated longitudinally from one end of its travel to the other with each revolution of the rotor 2.

Figures 7, 7A, 8, 9:
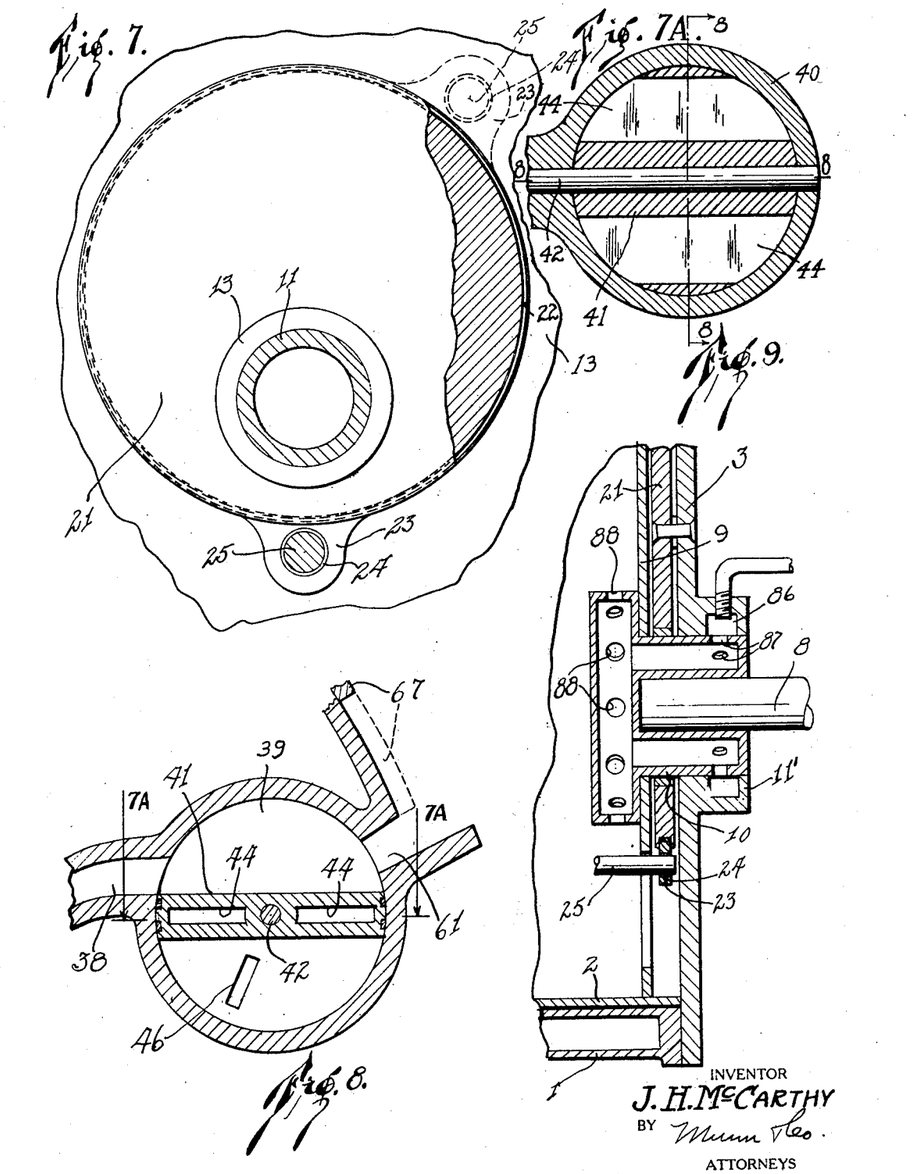

This oscillation of the connecting rod 20, hence reciprocating movement of the pistons 19 within their cylinders 18 with each revolution of the rotor is provided by the disposition of eccentric plates 21 on the walls 3 and 4 respectively. In Figures 4 and 7 I have shown the plate 21 associated with the wall 4, and in Figure 9 I have shown the plate 21 associated with the frame 3. Annular members 22 are rotatably mounted upon the peripheral walls of the eccentric plates 21 respectively, and each has a lug member 23 extending radially therefrom. These members 23 have openings 24 therethrough having their axes parallel with the axis of the rotor 2.

A transverse pin 25 is carried by one end of a slidable block 25ᵃ and engages at its opposite ends with the openings 24 in the lugs 23. A pin 25ᵇ rigidly connects the other end of the slidable block 25ᵃ with the connecting rod 20 and hence rotation of the rotor 2 causes an oscillatory movement of the connecting rod and reciprocating movement of the pistons 19.

The compression cylinders 18 have inlet chambers 28 communicating therewith, and also communicating with the adjacent manifold distributing member 17 when a valve 29 associated with the inlet chambers 28 is opened. This valve 29 is of the puppet valve type and has a stem 30 extending toward the axis of the rotor 2 which is yieldingly held against movement by a frictional shoe 31. The stem 30 has a pair of laterally extending fingers 32 and 33 respectively which are adapted for engagement with an arm 34 carried by rods 35, which rods are disposed parallel with the connecting rod 20 and secured to the connecting rod by cross arms 36 at a point adjacent to the pin 25ᵇ.

Figure 3:
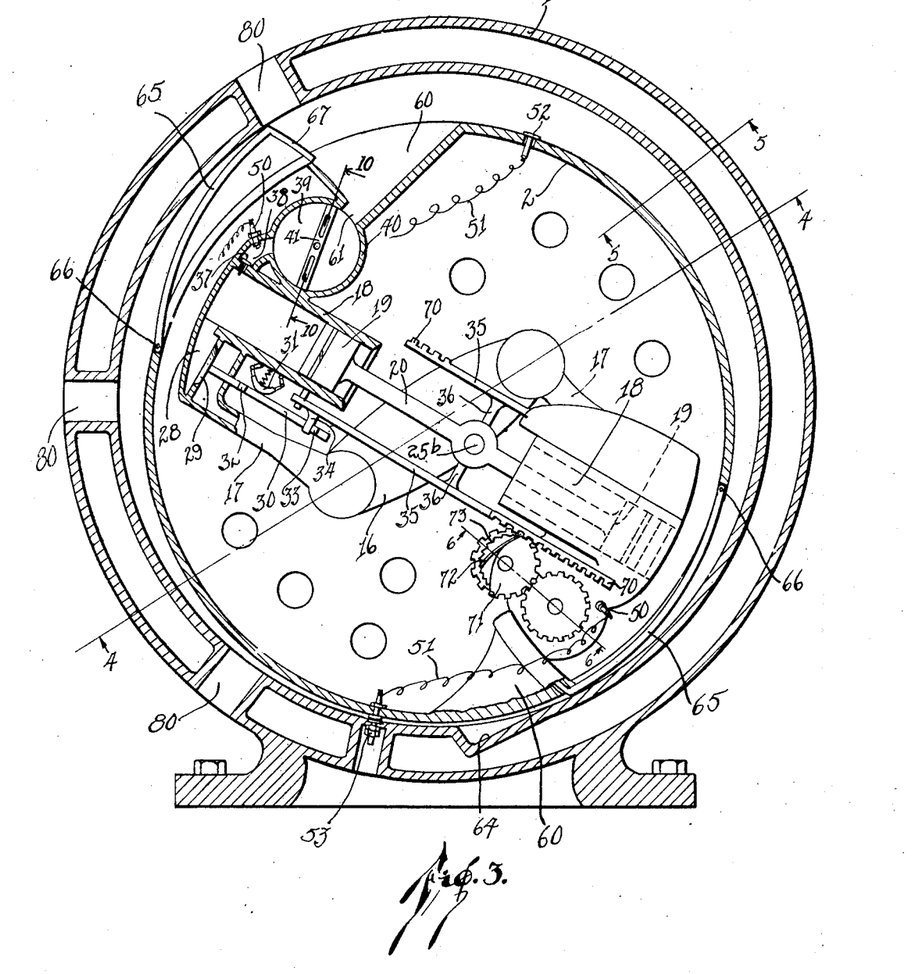
Figure 3 is a sectional view along the line 3—3 of Figure 1.

Referring now to Figure 3, when the piston 19 is in the position shown in this figure the valve associated with the lowermost compression cylinder 18 will have just opened, since this cylinder is in exactly the firing position. The valve 29 associated with the upper of the compression cylinders 18, as shown in the section lines, has just been closed, and upon upward movement of the piston 19 by further rotation of the rotor, a charge of fuel will be compressed in the cylinder 18.

As the fuel is compressed in the cylinder 18 a valve 37 will open and admit the fuel through a tubular duct 38 to the upper or outermost half 39 of a spherical firing chamber 40. A valve member 41 (see Figure 6) divides the chamber 40 into two parts, and is in the form of a rigid diaphragm which rotates upon its axis 42. When the valve 41 is in the position shown in Fig 3, i. e., I speak now of the valve 41 associated with the firing chamber 40 at the upper portion of the rotor; passages 44 which extend throughout the interior of the valve member 41 are in registration with ports 45 and 46 in the body of the spherical firing chamber 40. The port 46 communicates with a deflector plate 47 (see Figure 2) which, by virtue of its construction, causes air to be forced through the port 46, through the passages 44, and throughout the hollow interior of the valve 41 and out of the port 45 to the interior of the rotor 2. The reinforcing members 100, together with the deflector plate 47, causes air to pass through one of the perforated side plates, into the rotor, and then out through the other perforated side. Thus the valve 41 is cooled during a part of the rotation of the rotor 2. Means for firing the charge in the portion 39 of the spherical firing chamber 40 is provided in spark plugs 50 which are projected through the wall of the tubular members 38 and which are contacted by means of high tension cables 51 to contact members 52 disposed on the peripheral wall of the rotor 2. These contact members engage with a stationary contact member 53 projected through the lowermost wall of the stator body member 1 (see Figure 3). Thus the stator in Figure 3 is in such a position as to cause firing of the charge in the portion 39 of the firing chamber 40. At this very instant of firing, as explained heretofore, the valve 29 has been opened, and also the valve 41 will move so as to cause ignited fuel and products of combustion to leave the portion 39 for power purposes, and continued rotation of the rotor 2, by virtue of the firing in the chamber mentioned will cause fuel to be further compressed when the compression cylinder 18 attains the position of the diametrically opposite cylinder as shown in Figure 3.

Means for applying power and rotative movement to the rotor 2 when the charge in the portion 39 of the spherical firing cylinder 40 takes place, is provided in depressions 60 in the walls of the rotor 2 which communicate at their lowermost ends 61 with the spherical firing chamber 40 and through which portions the products of combustion from the part 39 enter to the depressions 60 as the valve 41 moves in a clockwise direction, as shown in Figure 3.

A tapering wall recess 64 is provided in the innermost wall of the stator 1 and bears such a relation with the adjacent recess 60 when the rotor is in the firing position as to provide an expansion chamber which, when expansion takes place therein, as by the presence of hot products of combustion and expanding gases, will cause a rotative movement of the rotor 2. Means for closing the space between the rotor 2 and the inner wall of the stator 1 and utilizing the full force and effect of the expanding gases is provided in a pair of radially projectable blades 65 which are hingedly mounted at 66 to the wall of the rotor 2, and which have portions 67 adapted to extend transversely across the space between the rotor 2 and the adjacent wall of the stator 1.

Means for maintaining the blade 65 in engagement with the adjacent face of the stator 1 is provided in a pair of rigid rods 69 which extend from one blade to the other and which also prevent extreme pressure of the blade 65 against the adjacent wall of the rotor 1 by virtue of centrifugal force.

Means for causing the valve 41 to move in clockwise direction, when the rotation of the rotor 2 is in a counter clockwise direction as viewed in Figure 3, is provided in toothed racks 70 carried by the rods 35 at the opposite ends from which are disposed the arms 34. These racks 70 engage with segmental pinions 71. Each of the segmental pinions 71 carries a spring pawl member 72 which in turn engages with ratchet teeth 73 on the inner peripheral wall of a ring gear 74. The ring gear 74 is in mesh with a gear 75 carried by the shaft, forming the axis 42 of the valve member 41.

Thus each movement of the rack 70 toward the center of the rotor 2 will cause the valve member 41 to move substantially 180°. There will be no movement of the valve when the rack is moving away from the center of the rotor 2, since the pawl 72 will slip over the ratchet teeth 73.

Means for exhausting the products of combustion and expanded gases from the space between the rotor 2 and the inner wall of the stator 1 is provided in three exhaust ports 80 provided through the stator body 1 at substantially equal distances from one another, and to the left of the vertical axis of the engine, as viewed in Figure 3. These exhaust ports 80 communicate with an exhaust manifold 81 which is connected by means of a pipe 82 with the ordinary type of muffler, or the gases are permitted to exhaust into the atmosphere, as desired.

Means for cooling the stator body 1 is provided in a water jacket 83 which extends throughout the entire body member 1 and through which water is circulated in any well known manner, such as by the provision of circulation pumps or thermo siphon.

Means for lubricating the moving parts of the engine, particularly the inner wall of the stator 1 is provided in an oil reservoir 84 which is connected by means of a tube 85 to an interior recess portion 86 of the bearing member 11. This recessed portion contacts with the bushing member 10.

The bushing member 10 is hollow, as shown in Figure 9, and has openings 87 registering with the recess 86 so that oil may pass within the hollow bushing 10 and be conducted to the interior of the rotor.

A plurality of openings or ports 88 are provided in the bushing 10 from which tubes (not shown) may be projected to the various parts of the rotor for the purpose of lubrication. I have not shown these tubes, since the lubricating features of the engine do not form any part of the invention.

Power is transmitted from my improved engine by the disposition of a pulley wheel 89 or the like upon the shaft 8, from which a belt may extend to counter shafts or other driven means.

From the foregoing description of the various parts of the device the operation thereof may be readily understood. The device is started in precisely the same manner as any other type of internal combustion engine which is by rotation of the shaft. As the shaft is rotated the rotor 2 will move in a counter clockwise direction, as viewed in Figure 3. At this time fuel is permitted to pass up through the manifold member 15ª, the hollow manifold member 11, through the members 15 and 17 and into one of the valves 29 which must be open, and hence into the adjacent cylinder 18.

In the cylinder 18 the fuel is compressed and forced through the valve 37 into the portion 39 above the valve member 41.

When the contact member 52 associated with and adjacent to the valve 41, into which the gases have been projected, contacts with the member 53, the spark plug associated therewith and shown at 50 will ignite the fuel in the portion 39 and at the same instant the valve 41 will start to open by virtue of the movement of the rack 70 toward the center of the rotor. The exact position of the recessed portion 60 associated with the firing chamber 40 having the valve 41 just referred to is that of the lower recess portion 60 illustrated in Figure 3. The result is an expansion of products of combustion and gases within the recessed portion 60 which exerts force against the recessed portion 64 to cause a counter clockwise rotation of the rotor 2. The blade 65 will move outwardly into engagement with the inner wall of the stator 1 so as to confine the expanded gases and prevent their escape into the space between the rotor 2 and the stator 1 beyond the blades.

When the blade 65 has reached the position of the uppermost blade shown in Figure 3 the gases will have been expanded and may exhaust through the ports 80.

One of the most important advantages attained in the operation of my improved engine is that when firing is taking place in the portion 39 of the firing chamber 40 cool air is being forced through the hollow portions 44 of the valve 41, thus preventing all possibility of the valves wasting through actual combustion or burning of the parts. This also prevents any warpage which might otherwise occur with thin valves.

Figure 1:
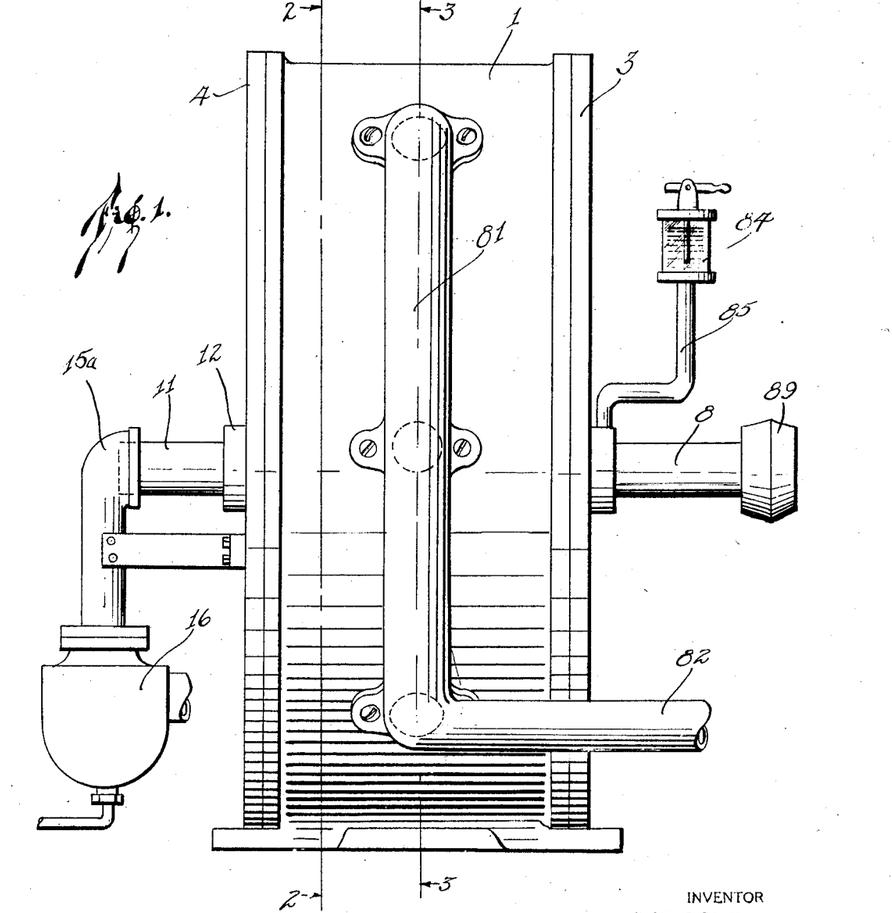
Figure 1 is an end elevation of an embodiment of my invention.
Figures 2, 10:
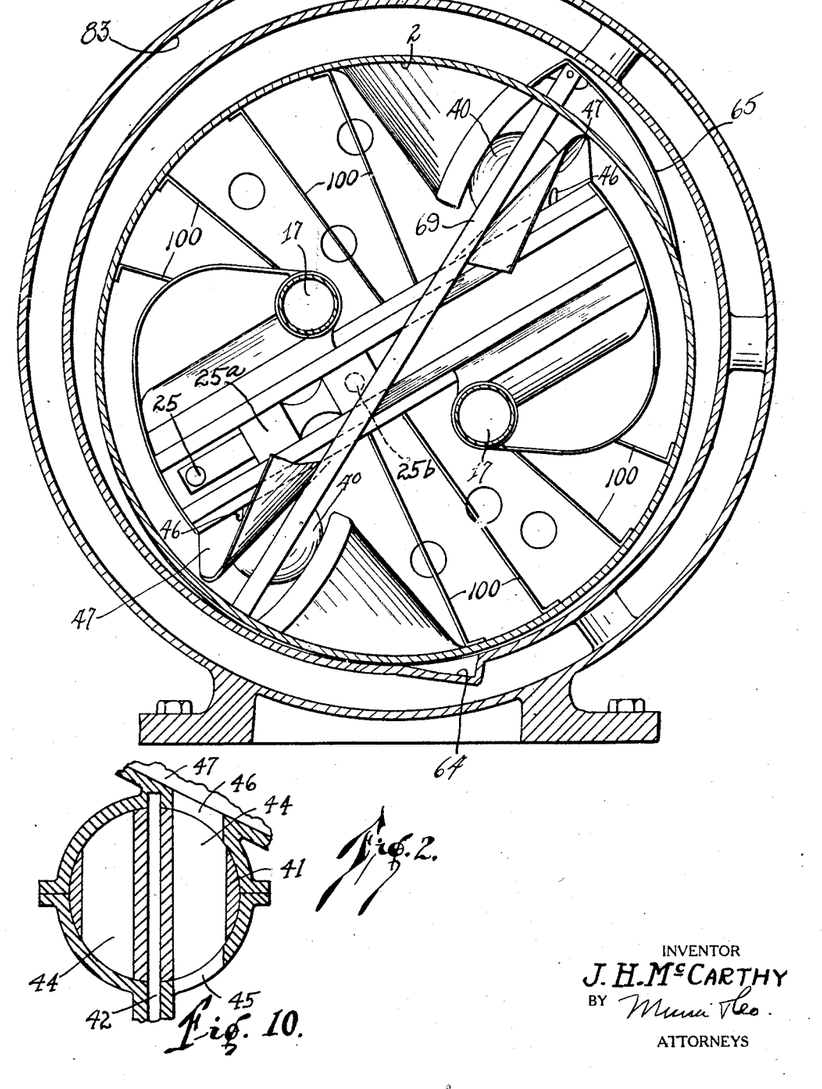
Figure 2 is a sectional view along the line 2—2 of Figure 1.
Figure 10 is a sectional view of the mechanism shown in Figure 6.

The provision of the portion 69 adequately prevents the blade member 65 from engaging with the inner wall of the stator 1 with such force as to create greater friction than that which would otherwise occur by virtue of centrifugal force, were the members 69 not present. In Figure 2 I have only shown one of the members 69. The other one is connected to the opposite edge of the blade 65 and is therefore behind the member 69, as illustrated in Figure 2.

Positive actuation of the compression pistons 19 and of the synchronous operation of the valves 29 and the valve members 41 is assured by virtue of the eccentric plate 21 and the ring 22 rotating about the plate with which the pin 25 is associated.

While I have here described how cool air passes through the valve 41 while in the position shown in Figure 3, it should be noted that at all times when the valve is out of registration with the openings 45 and 46 (see Figures 6 and 8) that cool air is circulating through the spherical firing chamber so as to cool the chamber between explosions. This feature is of utmost importance, since circulation of cool air through the chamber not only performs the function of cooling the chamber, but also blows out any products of combustion and dead air in the chamber so that when the vaporized fuel is admitted to the chamber under compression it may merge with pure air containing a large per cent of oxygen for the purpose of combustion.

I claim:

1. A rotary engine of the character described comprising a stator, a rotor eccentrically mounted within the stator, said rotor and said stator having recesses adapted for registration during portions of the revolution of the rotor to form a firing chamber, radially projectable blades carried by the rotor in registration with the recesses in the rotor and arranged to bear against the adjacent inner wall of the stator, compression cylinders in the rotor, means associated with the rotor and with the stator for causing reciprocating movement of the pistons in the cylinders, as the rotor revolves, means for admitting fuel to said cylinders, spherical firing chambers communicating with said compression cylinders, and with the recessed portions of the rotor, valve members dividing said firing chambers in two parts, means for revolving said valve members on the axis of the spherical firing chamber during portions of the revolution of the rotor, and means for igniting fuel in said spherical firing chambers when the recess associated with the firing chamber is in registration with the recess of the rotor, said valve actuating means being further arranged to rotate so as to permit the ignited fuel in said firing chamber to pass into the recess of the rotor simultaneously with the time of the firing.

2. A rotary engine of the character described comprising a stator, a rotor eccentrically mounted within the stator, said rotor and said stator having recesses adapted for registration during portions of the revolution of the rotor to form a firing chamber, radially projectable blades carried by the rotor in registration with the recesses in the rotor and arranged to bear against the adjacent inner wall of the stator, compression cylinders in the rotor, means associated with the rotor and with the stator for causing reciprocating movement of the pistons in the cylinders as the rotor revolves, means for admitting fuel to said cylinders, spherical firing chambers communicating with said compression cylinders, and with the recessed portions of the rotor, valve members dividing said firing chambers in two parts, means for revolving said valve members on the axis of the spherical firing chamber during portions of the revolution of the rotor, means for igniting fuel in said spherical firing chambers when the recess associated with the firing chamber is in registration with the recess of the rotor, said valve actuating means being further arranged to rotate so as to permit the ignited fuel in said firing chamber to pass into the recess of the rotor simultaneously with the time of the firing, and means associated with said spherical firing chamber and said valve in said chamber for circulating air through the interior portions of the valve member when said valve member is not moving.

3. A rotary engine of the character described comprising a stator, a rotor eccentrically mounted within the stator, said rotor and said stator having portions thereof forming an expansion chamber when the portions are in registration, as during the rotation of the rotor, means for compressing fuel within said rotor, a firing chamber communicating with the expansion chamber for receiving the compressed fuel from said compressing means, means for igniting the fuel in said firing chamber, whereby the products of combustion and expanding gases may enter the expanding chamber and cause the rotor to revolve, and means for admitting fresh air from the atmosphere and for forcing the air into and through said firing chamber when the firing chamber is not in operation, whereby the dead air and remaining products of combustion may be expelled.

4. A rotary engine of the character described comprising a stator, a rotor rotatably mounted within said stator, said stator and said rotor having recessed portions formed to provide an expansion chamber when the portions are in registration, as during the rotation of the rotor, radially projectable blades carried by the rotor and arranged to bear upon the adjacent inner wall of the stator in registration with the recesses of the rotor, means associated with said blades for limiting the movement of the blades with respect to one another, means for compressing fuel admitted to the rotor, a firing chamber communicating with the recessed portions of the rotor and arranged to receive the compressed fuel in said compressing means, means for igniting the fuel in said firing chamber, whereby the products of combustion and expanding gases may enter the registering recessed portions of the rotor and stator, and means associated with said firing chamber for admitting and forcing fresh air from the atmosphere through said firing chamber during the time that said firing chamber is not in operation.

5. A rotary engine of the character described comprising a stator, a rotor rotatably and eccentrically mounted within said stator, said stator and said rotor having recessed portions formed to provide an expansion chamber when the portions are in registration, as during the rotation of the rotor, radially projectable blades carried by the rotor and arranged to bear upon the adjacent inner wall of the stator in registration with the recesses of the rotor, means for compressing fuel admitted to the rotor, a firing chamber communicating with the recessed portions of the rotor and arranged to receive the compressed fuel in said compression means, means for igniting the fuel in said firing chamber, whereby the products of combustion and expanding gases may enter the registering recessed portions of the rotor and stator, and means associated with said firing chamber for admitting and forcing fresh air from the atmosphere through said firing chamber during the time that said firing chamber is not in operation.

6. In a device of the type described, a spherical firing chamber having an outlet, a valve member dividing said firing chamber into two parts, means for revolving said valve member on the axis of the spherical firing chamber at predetermined intervals, means for igniting fuel in said spherical firing chamber, said valve-actuating means being further arranged to rotate to permit the ignited fuel in said firing chamber to pass through said outlet, and means associated with said spherical firing chamber and said valve in said chamber for circulating air through the interior portions of the valve member when said valve member is not moving.

7. In a device of the type described, a spherical firing chamber having an outlet opening, a valve member dividing said firing chamber into two parts, means for revolving said valve member on the axis of the spherical firing chamber at predetermined intervals, and means for igniting fuel in said spherical firing chamber, said valve-actuating means being further arranged to rotate to permit the ignited fuel in said firing chamber to pass through said outlet simultaneously with the time of the firing.

8. In a device of the type described, a spherical firing chamber having an air inlet, an air outlet, and a tubular duct, a valve member having an air passageway adapted to communicate with said air inlet and said air outlet and dividing said firing chamber into two parts, means for revolving said valve member on the axis of the spherical firing chamber at predetermined intervals, means for igniting fuel in said spherical firing chamber, said valve-actuating means being further arranged to rotate to permit the ignited fuel in said firing chamber to pass through said tubular duct, and means associated with said spherical firing chamber for circulating air through said air inlet, said air passageway and said air outlet.

9. In a device of the type described, a spherical firing chamber having an air inlet, an air outlet, and a tubular duct, a valve member having air passageways adapted to communicate with said air inlet and said air outlet and dividing said firing chamber into two parts, means for revolving said valve member on the axis of the spherical firing chamber at predetermined intervals, means for igniting fuel in said spherical firing chamber, said valve-actuating means being further arranged to rotate to permit the ignited fuel in said firing chamber to pass through said tubular duct, and a deflector adapted to direct air through said air inlet, through said spherical firing chamber, and through said air outlet when said passageways are out of alignment with said air inlet and said air outlet and for forcing air through said air inlet, said air passageways and said air outlet when said passageways are in alignment with said air inlet and said air outlet.

10. In a device of the type described, a combustion chamber having an inlet air port and an outlet air port, whereby fresh air may be passed through said combustion chamber, and a valve rotatably disposed in said combustion chamber and provided with a passageway arranged to communicate simultaneously with said inlet air port and said outlet air port.

11. In a device of the type described, a combustion chamber having an inlet air port and an outlet air port, whereby fresh air may be passed through said combustion chamber, and a valve rotatably disposed in said combustion chamber and provided with a passageway arranged to communicate simultaneously with said inlet air port and said outlet air port, said air ports being arranged to alternately direct air through said combustion chamber and through said valve for cooling said combustion chamber and said valve.

JOHN H. McCARTHY.